United States Patent [19]

Fuentes

[11] Patent Number: 4,876,226

[45] Date of Patent: Oct. 24, 1989

[54] SILICON CARBIDE SINTERING

[76] Inventor: Ricardo I. Fuentes, 2022 Renee Dr., Eagle Pass, Tex. 78852

[21] Appl. No.: 2,106

[22] Filed: Jan. 12, 1987

[51] Int. Cl.$^4$ ............................................... C04B 35/46
[52] U.S. Cl. ......................................... 501/89; 501/90
[58] Field of Search ..................... 501/89, 90, 100, 101

[56] References Cited

U.S. PATENT DOCUMENTS

| | | | |
|---|---|---|---|
| 2,040,236 | 5/1936 | Benner et al. | 501/89 |
| 4,141,740 | 2/1979 | Cutler et al. | 501/89 |
| 4,354,991 | 3/1986 | Suzuki . | |
| 4,569,921 | 2/1986 | Omori et al. | 501/89 |

FOREIGN PATENT DOCUMENTS 2125066  2/1984  United Kingdom .

OTHER PUBLICATIONS

"Materials Handbook for Traditional and Advanced Ceramics", *Ceramic Industry*, Jan. 1987, p. 108.
Suzuki et al. (1984) "Pressureless Sintering of Silicon Carbide".
Wozniak et al. (1978) CA 88:65075q.
Mizin et al. (1968) CA 68:65341k.
Swisher et al. (1969) CA 70:14881V.
Lung et al. (1978) CA 89:10073C.
Japanese Patent (1985) CA 102:171499Y.
Hirano et al. (1986) CA 104:114408K.

*Primary Examiner*—William R. Dixon, Jr.
*Assistant Examiner*—David M. Brunsman
*Attorney, Agent, or Firm*—Fish and Richardson

[57] ABSTRACT

A pressureless liquid phase sintering method for increasing the density of silicon carbide using a sintering composition that includes silicon carbide, calcia, and alumina.

22 Claims, No Drawings

SILICON CARBIDE SINTERING

BACKGROUND OF THE INVENTION

This invention relates to sintering silicon carbide.

Silicon carbide is a strong, oxidation-resistant ceramic material which retains its strength even at high temperatures. It is thus useful in many high temperature structural applications, e.g., turbines.

Silicon carbide typically exists as a powder. In order to prepare high strength products, it is necessary to densify the powder. This is usually done by compacting the powder under pressure and subsequently heating it in the absence of pressure (pressureless sintering), or by simultaneously heating and compacting the powder under pressure (hot pressing). When pressureless sintering is used, it is necessary to employ a sintering aid because without such an aid silicon carbide will not densify, as is true of most covalently bonded materials.

SUMMARY OF THE INVENTION

In general, the invention features in a first aspect a pressureless liquid phase sintering method for increasing the density of silicon carbide including the steps of providing a sintering composition that includes silicon carbide, alumina, and calcia; and heating the composition at a sintering temperature sufficient to form a liquid phase including aluminum oxycarbides (i.e. compounds containing aluminum, oxygen, and carbon, e.g., $Al_4O_4C$ and $Al_2OC$) for promoting the densification of the sample, the calcia being present in an amount sufficient to cause the amount and rate of formation of the liquid phase to be greater than that produced using alumina alone.

In a second aspect the invention features a pressureless sintering method for increasing the density of silicon carbide including the steps of providing a sintering composition that includes silicon carbide, alumina, and calcia; and heating the composition at a sintering temperature whereby the alumina and calcia cause the density to increase to at least 98% of the theoretical density (as determined by pore count) in one hour or less (as measured from the time heating at the sintering temperature begins).

In a third aspect the invention features a Pressureless sintering method for increasing the density of silicon carbide including the steps of providing a sintering composition that includes silicon carbide, alumina, and calcia, but excludes rare earth oxides (i.e. oxides of elements having atomic numbers 58-71); and heating the composition at a sintering temperature sufficient to increase the density of the silicon carbide.

In a fourth aspect, the invention features a pressureless sintering method for increasing the density of silicon carbide including the steps of providing a sintering composition that includes silicon carbide and at least one aluminum oxycarbide; and heating the composition at a temperature sufficient to increase the density of the silicon carbide.

In preferred embodiments, the sintering composition includes alpha-silicon carbide or beta-silicon carbide, and the combined amount of alumina and calcia is at least 0.05% by weight, preferably between 1 and 20% by weight (silicon carbide making up the remainder), of which calcia represents at least 0.01% by weight, preferably between 0.1 and 10% by weight. The weight to weight ratio of calcia to alumina is at least 0.001, preferably between 0.1 and 1. The composition preferably also contains at least 0.4% by weight of free carbon (i.e. carbon not covalently bonded to silicon in silicon carbide).

Preferred reaction temperatures are less than about 1900° C., and more preferably between 1835° and 1860° C. The heating step is conducted in an aluminum-enriched atmosphere (i.e. the aluminum content of the atmosphere is greater than that of the sintering composition). The density of the sample is preferably increased to at least 99% of the theoretical density, and more preferably to 100%. Preferably, silicon carbide, calcia, and alumina are admixed and then heated in a closed container in the presence of a packing powder that includes alumina and calcia in amounts greater than the amounts contained in the admixture. The linear shrinkage of the sample after heating is less than about 25% and more preferably between 5 and 15%. Preferably, calcia enhances liquid formation by the formation of vapor phase species that contain aluminum and oxygen.

The invention provides a simple, efficient method for preparing high density silicon carbide products. Densities of at least 98% can be obtained in under one hour at relatively low temperatures. In addition, the degree of shrinkage during heating is minimized, making near net shape fabrication possible. Furthermore, because the invention is compatible with known forming processes, silicon carbide parts having complex shapes can be prepared.

Other features and advantages will be apparent from the following description of the preferred embodiments thereof, and from the claims.

DESCRIPTION OF THE PREFERRED EMBODIMENTS

We now describe the preferred embodiments of the invention.

Preparation

Alpha silicon carbide (SiC) powder is combined with 7 7% by weight alumina ($Al_2O_3$) powder and 0.3% by weight calcia (CaO) powder; the weight to weight ratio of calcia to alumina is 0.04. An organic solvent, preferably a mixture of t-butyl alcohol and t-amyl alcohol, is then added, and the resulting slurry is dispersed briefly (preferably for less than 10 minutes) in an ultrasonic cell disruptor. The resulting dispersion is then freeze-dried under vacuum until all the solvent is removed. The purpose of the ultrasonic dispersion and freeze-drying is to achieve a powder having a uniform composition throughout.

After drying is complete (approximately 12 hours), the powder is cold pressed into a pellet in a hardened steel die with an applied load of between 2000–3000 lbs. Cold pressing typically increases the density of the powder to about 55% of the theoretical density. The pellet is then placed inside a graphite crucible which has been pre-fired at temperatures above 2000° C. to eliminate impurities and contaminants, and a packing powder containing alpha silicon carbide, alumina, and calcia added. Preferably, the packing powder is enriched, i.e. the packing powder contains greater weight percentages of calcia and alumina than does the pellet. The most preferred packing powder is 10-7-0.7 powder, which contains 10 parts silicon carbide, 7 parts alumina, and 0.7 parts calcia. Using enriched packing powder increases the density of the final sintered product.

After the packing powder and pellet have been loaded into the crucible, the crucible is closed to minimize evaporation during heating; this also leads to sintered products having higher densities. The crucible is then loaded into a carbon tube furnace through which an inert gas flows. The preferred inert gas is ultrapurified helium containing less than 1 ppm oxygen. The samples are then heated at about 35° C./min until the desired sintering temperature is reached. Preferred sintering temperatures are between 1835° C. and 1860° C.; sintering temperatures above 1900° C. generally do not yield further increases in density. The sintering temperature is maintained for about one hour, after which the crucible is cooled and removed. The silicon carbide pellet is then removed. The densities of pellets sintered according to this method are at least 98% of the theoretical density, as determined by pore count.

EXAMPLE

Alpha silicon carbide powder, mostly of the 6H polytype (LONZA Carbogram UF 15) and having a specific BET surface area of approximately 15 $m^2/gr$ was combined in a beaker with finely powdered calcia (Mallinckrodt) and ultrapure alumina powder (Reynolds HP DBM $Al_{23}$ without MgO). A mixture of 9 parts t-butyl alcohol and 1 part t-amyl alcohol was then added to form a slurry. The slurry was ultrasonically disPersed for 6 minutes in an ultrasonic cell disruptor (Heat Systems, 200 watt maximum output) set at 60 to 70% of its total output power. The beaker was water-cooled to dissipate heat generated during the dispersion process.

Immediately following the ultrasonic dispersion, the contents of the beaker were sprayed over a liquid nitrogen reservoir using a conventional spray gun to freeze the powder. The frozen powder was then vacuum dried in a Virtys vacuum dryer at pressures less than 100 microns for about 12 hours to remove solvent.

After freeze-drying, the powder was cold-pressed into a pellet in a hardened steel die (diameter=5/16 in.) under an applied weight of 2000–3000 lbs. The pellet was then placed in a graphite crucible (¾ in. long by 9/16 in. outside diameter) pre-fired at 2210° C. The remaining volume of the crucible was filled with 10—7–0.7 packing powder and the crucible closed. The loaded crucible was then placed in a horizontal cabon tube furnace (internal diameter=1.25 in.) under an atmosphere of ultrapure helium (flow rate=0.1 scfh) and heated to 1850° C. at a heating rate of 35° C./min Once the temperature reached 1850° C., it was maintained there for one hour. The crucible was then removed and cooled. The density of the sintered silicon carbide pellet, as measured by pore count, was approximately 100% of the theoretical density (with the exception of some local, isolated areas containing fabrication flaws in which the density was less than 100%). The linear shrinkage of the sample was approximately 11%.

It is believed that the sintering of silicon carbide with calcia and alumina sintering aids proceeds via liquid phase sintering. This sintering mechanism involves forming a liquid phase at the sintering temperature. In the silicon carbide-alumina-calcia system this liquid is composed of alumina and aluminum oxycarbides, and forms at about 1835±20° C. This liquid promotes sintering by facilitating center-to-center approach of the silicon carbide particles and pore elimination to form a denser material.

By increasing the amount of liquid available and the rate at which it forms, denser materials can be prepared in shorter periods of time. It is believed that calcia achieves this by enhancing the vapor phase transport of oxyaluminum species (believed to have the formula $Al_2O$), which then promote liquid formation. In contrast, in the absence of calcia liquid formation proceeds by a slower solid-solid reaction.

The use of an enriched packing powder and closed crucible further enhances liquid formation by creating an aluminum-enriched atmosphere surrounding the sample pellet. This causes the oxyaluminum species to be transported preferentially into the sample pellet. In the case of the packing powder, this occurs because the concentration of oxyaluminum species in the powder is greater than that in the sample, resulting in net transport into the sample. The closed crucible forces the oxyaluminum species to be transported into the sample, rather than into the surrounding atmosphere.

Use

Sintered silicon carbide prepared according to the above-described method is useful in a variety of structural applications in which high temperatures and oxidative atmospheres are encountered. Examples of such applications include turbine blades for high performance aircraft and missile engines, turbocharger rotors for heat engines, and wear-resistant parts for diesel and heat engines, e.g., piston rings, valve seats, and bushings. Because little shrinkage occurs during sintering, near net shape fabrication is possible. The method is compatible with known forming processes, e.g., slip casting and injection molding. Thus, it can be used to produce silicon carbide parts having complex shapes.

Other embodiments are within the following claims.

For example, beta silicon carbide can also be sintered according to the above-described method.

Instead of admixing silicon carbide, calcia, and alumina prior to sintering, silicon carbide (e.g., in the form of a pellet) can simply be surrounded by packing powder containing calcia and alumina, and then sintered.

Free carbon (i.e. carbon not covalently bound to silicon in silicon carbide) can also be added to the sintering composition; preferably, at least 0.4% by weight is added.

Aluminum oxycarbides (e.g., $Al_2OC$ and $Al_4O_4C$) can be added directly to silicon carbide in order to promote sintering; preferably, calcia and alumina are added as well. Free carbon can further be added.

I claim:

1. A pressureless liquid phase sintering method for increasing the density of silicon carbide comprising the steps of
    adding alumina and at least 0.1% by weight of a calcia catalyst to said silicon carbide to form a sintering composition,
    said sintering composition being substantially free of rare earth oxides; and
    heating said composition at a sintering temperature sufficient to form a liquid phase comprising aluminum oxycarbides for promoting the densification of said sample,
    the amount of said calcia catalyst being sufficient to cause the amount and rate of formation of said liquid phase to be greater than that produced using said alumina alone.

2. The method of claim 1 wherein the combined amount of said alumina and said calcia is at least 0.05% by weight.

3. The method of claim 1 wherein the amount of said calcia is between 0.1 and 10% by weight.

4. The method of claim 1 wherein the weight to weight ratio of said calcia to said alumina is at least 0.001.

5. The method of claim 1 wherein the weight to weight ratio of said calcia to said alumina is between 0.1 and 1.

6. The method of claim 1 wherein said composition further comprises free carbon.

7. The method of claim 6 wherein the amount of said free carbon is at least 0.4% by weight.

8. The method of claim 1 wherein said sintering temperature is less than 1900° C.

9. The method of claim 1 wherein said sintering temperature is between 1835° and 1860° C.

10. The method of claim 1 wherein said composition is heated in the presence of a packing powder comprising alumina and calcia.

11. The method of claim 10 wherein the amounts of said alumina and said calcia in said packing powder are greater than the amounts of said alumina and said calcia in said composition.

12. The method of claim 1 wherein said composition is heated in a closed container.

13. The method of claim 1 wherein said silicon carbide comprises alpha or beta silicon carbide.

14. The method of claim 1 wherein the linear shrinkage of said sample after said heating is less than 25%.

15. The method of claim 1 wherein the linear shrinkage of said sample after said heating is between 5 and 15%.

16. The method of claim 1 wherein said heating step conducted in an aluminum-enriched atmosphere.

17. A pressureless sintering method for increasing the density of silicon carbide comprising the steps of adding alumina and at least 0.1% by weight of a calcia catalyst to said silicon carbide to form a sintering composition, said sintering composition being substantially free of rare earth oxides; and heating said composition at a sintering temperature, the amount of said alumina and said calcia catalyst being sufficient to cause said density to increase to at least 98% of the theoretical density in one hour or less.

18. The method of claim 17 wherein said density of said sample is increased to at least 99% of said theoretical 19. The method of claim 18 wherein said density of said sample is increased to 100% of said theoretical density.

20. A pressureless sintering method for increasing the density of silicon carbide comprising the steps of adding alumina and at least 0.1% by weight of a calcia catalyst to said silicon carbide to form a sintering composition, said sintering composition being substantially free of rare earth oxides; and heating said composition at a sintering temperature sufficient to increase said density of said silicon carbide.

21. A pressureless sintering method for increasing the density of silicon carbide comprising the steps of adding at least one aluminum oxycarbide to said silicon carbide to form a sintering composition, said sintering composition being substantially free of rare earth oxides; and sintering said composition at a temperature sufficient to increase said density of said silicon carbide.

22. The method of claim 21 wherein said composition further comprises adding alumina, a calcia catalyst, carbon, or a combination thereof to said silicon carbide.

* * * * *

UNITED STATES PATENT AND TRADEMARK OFFICE
CERTIFICATE OF CORRECTION

PATENT NO. : 4,876,226
DATED : October 24, 1989
INVENTOR(S) : Ricardo I. Fuentes It is certified that error appears in the above-identified patent and that said Letters Patent is hereby corrected as shown below:

Column 2, line 41, "77%" should be --7.7%--.

Column 4, lines 66-68, Claim 2 should read --The method of claim 1 wherein the combined amount of said aluminum and said calcia is between 1 and 20% by weight--.

Column 6, line 13, insert --density.-- after "cal".

Signed and Sealed this

Seventh Day of January, 1992

Attest:

HARRY F. MANBECK, JR.

*Attesting Officer*      *Commissioner of Patents and Trademarks*